United States Patent
Nou et al.

(10) Patent No.: US 8,763,395 B2
(45) Date of Patent: Jul. 1, 2014

(54) ENGINE WITH SUPERCHARGER

(75) Inventors: Yoshihisa Nou, Hiroshima (JP);
Naoyuki Yamagata, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 1165 days.

(21) Appl. No.: 12/710,901

(22) Filed: Feb. 23, 2010

(65) Prior Publication Data
US 2010/0242473 A1 Sep. 30, 2010

(30) Foreign Application Priority Data

Mar. 26, 2009 (JP) ................................. 2009-075441

(51) Int. Cl.
*F02B 33/44* (2006.01)

(52) U.S. Cl.
USPC .......................... 60/612; 123/562; 123/90.15

(58) Field of Classification Search
USPC ....................... 60/612; 123/562, 90.15, 90.17
See application file for complete search history.

(56) References Cited

U.S. PATENT DOCUMENTS

| | | | | |
|---|---|---|---|---|
| 1,910,279 A * | 5/1933 | Buchi | ........................... | 60/605.1 |
| 1,921,907 A * | 8/1933 | Buchi | ........................... | 60/605.1 |
| 2,730,861 A * | 1/1956 | Buchi | ........................... | 60/605.1 |
| 3,029,594 A * | 4/1962 | Miller | .......................... | 60/605.1 |
| 3,383,092 A * | 5/1968 | Cazier | .......................... | 415/186 |
| 3,591,959 A * | 7/1971 | Kubis | ........................... | 60/605.1 |
| 3,948,052 A * | 4/1976 | Merkle et al. | ................. | 60/605.1 |
| 4,008,572 A * | 2/1977 | Woollenweber, Jr. | .......... | 60/602 |
| 4,179,892 A * | 12/1979 | Heydrich | ....................... | 60/605.2 |
| 4,355,503 A * | 10/1982 | Grohn | ............................. | 60/602 |
| 4,611,465 A * | 9/1986 | Kato et al. | ....................... | 60/602 |
| 5,421,308 A * | 6/1995 | Hitomi et al. | ................ | 123/559.1 |
| 5,791,146 A * | 8/1998 | Dungner | ....................... | 60/605.1 |
| 5,987,884 A * | 11/1999 | Kibe et al. | ....................... | 60/286 |
| 6,324,847 B1 * | 12/2001 | Pierpont | ........................ | 60/605.2 |
| 6,877,492 B1 * | 4/2005 | Osterwald | ................ | 123/568.11 |
| 7,574,862 B2 * | 8/2009 | Giselmo et al. | ................. | 60/612 |
| 7,637,106 B2 * | 12/2009 | Hertweck et al. | ............... | 60/602 |
| 8,161,747 B2 * | 4/2012 | Pierpont et al. | .............. | 60/605.2 |
| 8,196,403 B2 * | 6/2012 | Hittle et al. | ...................... | 60/602 |
| 8,522,547 B2 * | 9/2013 | Sumser et al. | ................... | 60/597 |
| 2001/0052331 A1 * | 12/2001 | Nakamura | ................. | 123/90.17 |
| 2005/0247058 A1 * | 11/2005 | Pedersen et al. | ................ | 60/599 |
| 2009/0120087 A1 * | 5/2009 | Sumser et al. | ................... | 60/600 |

FOREIGN PATENT DOCUMENTS

| JP | S59-160027 A | | 9/1984 |
|---|---|---|---|
| JP | H11-117754 A | | 4/1999 |
| JP | 2008-031942 A | | 2/2008 |
| JP | 2008031942 A | * | 2/2008 |

OTHER PUBLICATIONS

Machine Translation of JP-2008-031942, Translated on Sep. 12, 2013.*
The Japanese Office Action "Notice of Reasons for Rejection" dated Feb. 22, 2011; Japanese Patent Application No. 2009-075441 with translation.

* cited by examiner

*Primary Examiner* — Thomas Denion
*Assistant Examiner* — Patrick Maines
(74) *Attorney, Agent, or Firm* — Studebaker & Brackett PC

(57) ABSTRACT

A four-cylinder engine has a valve overlap period during which an exhaust valve and an intake valve of each cylinder are both opened. Cylinder pipes for cylinders having adjacent ignition timings of the engine are connected to a turbo charger, and cylinder pipes for cylinders having adjacent ignition timings are connected to another turbo charger. Accordingly, a properly great supercharging pressure can be obtained in a low engine-speed area.

2 Claims, 5 Drawing Sheets

US 8,763,395 B2

ENGINE WITH SUPERCHARGER

BACKGROUND OF THE INVENTION

The present invention relates to an engine with a supercharger, and in particular relates to an engine equipped with a turbo charger which performs a dynamic-pressure supercharging without using a manifold.

In the engine equipped with the turbo charger, the dynamic-pressure supercharging to enhance a drive force of a turbine wheel through a direct injection of the exhaust gas from each cylinder to the turbine wheel has recently become more popular than the static-pressure supercharging in which the exhaust gas from the plural cylinders is collected by an exhaust manifold and then injected toward the turbine wheel.

Japanese Patent Laid-Open Publication No. 2008-31942 from the present applicant, for example, proposed the engine with a supercharger, in which exhaust passages of the engine which connect to the exhaust ports of the cylinders are divided into two groups, each group being provided for the cylinders, ignition timings of which are not adjacent to each other, and one of the groups provided for two cylinders which are positioned closely to each other having a relatively small passage volume is connected to a relatively outside position of the turbine wheel, while the other of the groups provided for two cylinders which are positioned far away from each other having a relatively large passage volume is connected to a relatively inside position of the turbine wheel. Thereby, the exhaust gas having a greater flowing speed is made hit against an outside portion of the turbine wheel, so that the high supercharging can be provided effectively.

According to the engine of the above-described publication, however, since the exhaust gas from all of the cylinders is collected for the single turbo charger, there is a problem in that in case the mixture gas becomes lean, the temperature of the exhaust gas decreases, so that the rotational speed of the turbine wheel becomes so small especially in a low engine-speed area that a properly great supercharging pressure may not be obtained.

SUMMARY OF THE INVENTION

Accordingly, an object of the present invention is to provide an engine with a supercharger which can obtain the properly great supercharging pressure in the low engine-speed area.

According to the present invention, there is provided an engine with a supercharger, in which exhaust ports of plural cylinders are arranged in line at one or more cylinder heads, exhaust gas from the exhaust ports is introduced to a turbo charger, and an exhaust valve and an intake valve of each cylinder have a valve overlap period during which the exhaust valve and the intake valve are both opened, wherein exhaust passages of the engine which connect to the exhaust ports of the cylinders are divided into at least two groups, each group being provided for the cylinders, ignition timings of which are adjacent to each other, and the turbo charger comprises plural chargers which are arranged for the plural groups of exhaust passages, respectively.

According to the present invention, even in case the exhaust-gas temperature decreases due to the lean combustion (burn), the properly compact turbines of the plural turbo chargers can be rotated efficiently even in the low engine-speed area, so that the properly great supercharging pressure can be obtained. Further, since the exhaust passages of the engine are configured such that the exhaust gas from the cylinders which have the adjacent ignition timings is supplied to the single turbine, the rotational speed of the turbine can be properly increased. This is because scavenging in the intake stroke of the cylinder having the early ignition timing is promoted by the suction function of the exhaust stroke of the cylinder having the late ignition timing, and additional exhaust gas from the cylinder having the late ignition timing is supplied to the turbine when the turbine has been driven by the exhaust gas from the cylinder having the early ignition timing.

According to an embodiment of the present invention, the engine comprises a single cylinder head, four cylinders, and two groups of exhaust passages, and two cylinders of each group which have adjacent ignition timings are arranged side by side, including a cylinder which is positioned at an end of the engine. Herein, the order of the ignition timing of the four-cylinder engine is generally #1, #3, #4, and #2 or #1, #2, #4, and #3 (herein, # means the cylinder number), so that the combination of the two cylinders of the four-cylinder engine which have adjacent ignition timings may be #3, #4 and #1, #2. According to the above-described embodiment, each of the two groups of exhaust passages can be comprised of the shortest passages, so that the volume of passage from the exhaust ports to the turbine can be made as small as possible. Thereby, the exhaust loss decreases so that the supercharging effect can be further improved.

According to another embodiment of the present invention, each of the two chargers is arranged beside the cylinder head in such a manner that a turbine thereof is positioned inward and close to a cylinder which is positioned at an end of the engine, a compressor thereof is positioned outward, and a turbine shaft thereof which is arranged substantially in parallel to an arrangement direction of the exhaust ports, exhaust passages downstream of the turbines of the two chargers collect substantially at a central position between the two turbines, and a single exhaust passage downstream of a collective portion of the exhaust passages extends substantially perpendicularly to a shaft direction of the turbine shaft. Herein, in general, in case the collective portion of the exhaust passages is located between the two turbines, there is a concern that a smooth flow of the exhaust gas may not be obtained if the collective portion is positioned closely to the chargers. Further, in case the single exhaust passage downstream of the collective portion is configured to curve with an angle of about 90 degrees from the collective portion, it may be necessary that the area of cross section of the exhaust passage is made large enough to ensure the sufficient amount of exhaust gas flowing down in the exhaust passages in order to lighten the influence of a sharp curvature of the exhaust passages at the collective portion. Meanwhile, according to the above-described embodiment, the turbines can be positioned at portions near the both end cylinders, respectively, in such a manner that the front-side charger is positioned at the front-side portion of the engine and the rear-side charger is positioned at the rear-side portion of the engine, so that the distance between the two chargers can be properly large. Thereby, the exhaust passages are connected to the turbo charger (two chargers) with the properly small volume of the exhaust passages, so that the exhaust loss can be further decreased and the supercharging effect can be improved.

According to another embodiment of the present invention, wherein each of the two groups of exhaust passages comprises two cylinder pipes which connect to the exhaust ports of the cylinder head, respective turbines of the turbo chargers comprises a turbine scroll which is connected to the two cylinder pipes, in which a turbine wheel driven by the exhaust gas is stored, and one of the two cylinder pipes for the cylinders having a relatively early ignition timing is connected to a relatively outside position of the turbine scroll, while the other of the two cylinder pipes for the cylinders having a relatively late ignition timing is connected to a relatively inside position of the turbine scroll. Thereby, the distance from the center of main flow of the exhaust gas in the cylinder pipe for the cylinder having the relatively early ignition timing to the rotational center of the turbine wheel becomes longer than that from the center of main flow of the exhaust gas in the cylinder pipe for the cylinder having the relatively late ignition timing to the rotational center of the turbine wheel, so that a ratio of A/R (the passage area A relative to the distance R from the rotational center of the turbine wheel) of the cylinder pipe which is positioned more closely to the turbine wheel is set to be properly great despite the same diameter of the cylinder pipe (exhaust passage). Accordingly, the dynamic pressure at the exhaustion can be increased properly. Thus, by setting this cylinder as the one having the relatively late ignition timing, the composite dynamic pressure at the turbine can be increased, that is, the rotational speed of the turbine can be further increased by the additional exhaust gas from the cylinder having the late ignition timing after the turbine has been driven by the exhaust from the cylinder having the early ignition timing. Thereby, the turbine drive force can be properly enhanced.

According to another embodiment of the present invention, wherein each of the two groups of exhaust passages comprises two cylinder pipes which connect to the exhaust ports of the cylinder head, respective turbines of the turbo chargers comprises a turbine scroll which is connected to the two cylinder pipes, in which a turbine wheel driven by the exhaust gas is stored, and one of the two cylinder pipes for the cylinders having a relatively early ignition timing is connected to a relatively inside position of the turbine scroll, while the other of the two cylinder pipes for the cylinders having a relatively late ignition timing is connected to a relatively outside position of the turbine scroll. Thereby, the distance from the center of main flow of the exhaust gas in the cylinder pipe for the cylinder having the relatively early ignition timing to the rotational center of the turbine wheel becomes shorter than that from the center of main flow of the exhaust gas in the cylinder pipe for the cylinder having the relatively late ignition timing to the rotational center of the turbine wheel, so that by connecting the cylinder pipe to a position farther from the turbine, the exhaust gas acts at a forward position in the rotational direction of the turbine and the large Coriolis force is produced. Thus, by setting this cylinder as the one having the relatively late ignition timing, the suction force can be made act on the cylinder pipe for the cylinder having the early ignition timing. Thereby, the scavenging effect can be improved.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
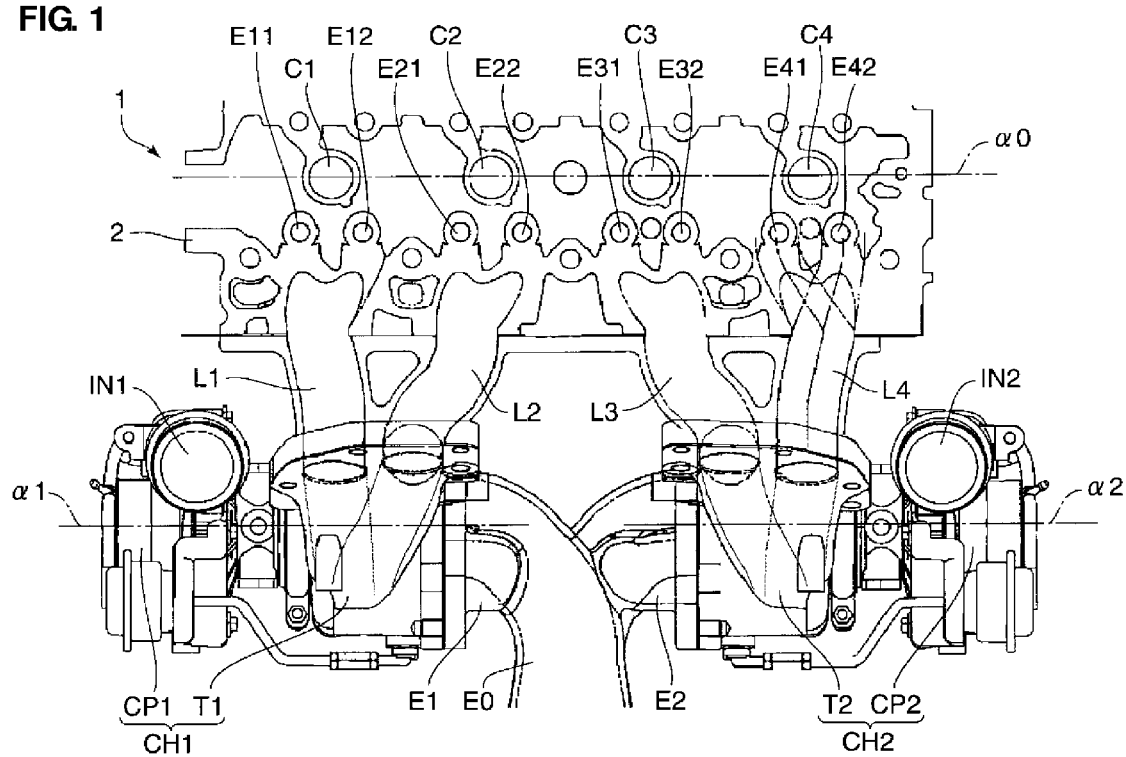
FIG. 1 is a sectional view of a major portion of an engine equipped with a supercharger according an embodiment of the present invention.

FIG. 1 is a sectional view of a major portion of an engine 1 which is equipped with a supercharger according an embodiment of the present invention. The engine 1 of FIG. 1 is an inline four-cylinder four-valve engine in which exhaust ports E11, E12; E21, E22; E31, E32; E41, E42 (hereinafter, referred to as E when described generally) of four cylinders C1, C2, C3, C4 (hereinafter, referred to as C when described generally) are arranged in line at a cylinder head 2. However, another multi-cylinder engine with more cylinders, a V-shaped engine with each bank having the even number of cylinders, or an engine having two, three, or five valves at each cylinder may be applicable.

Figure 5:
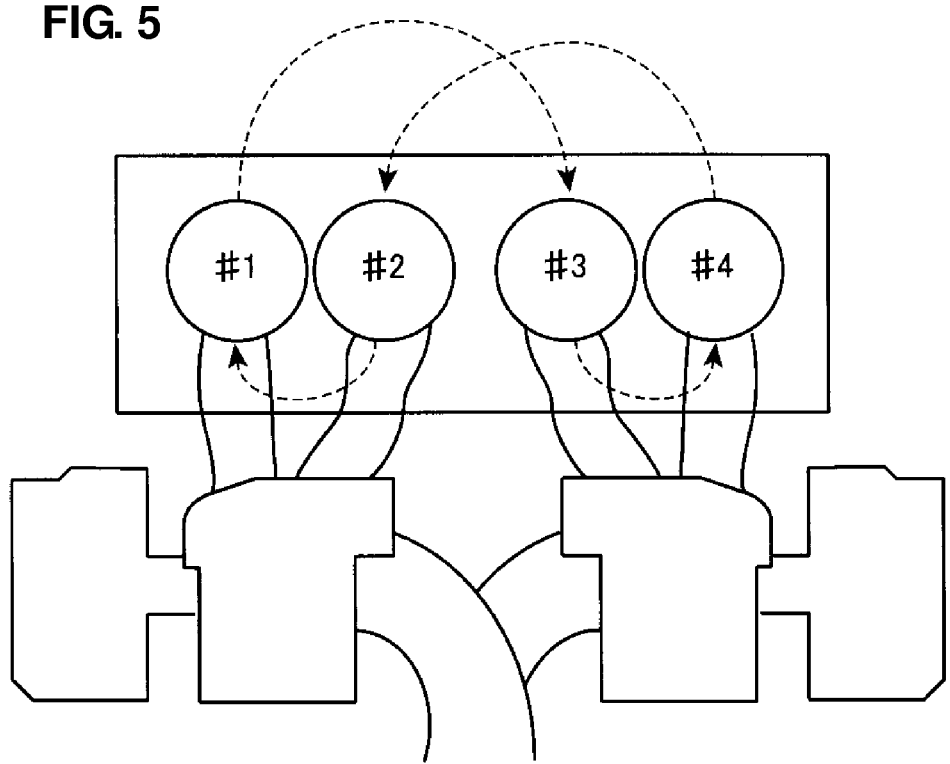
FIG. 5 is a diagram showing the order of an ignition timing of an inline four-cycle four-cylinder engine.
Figure 6:
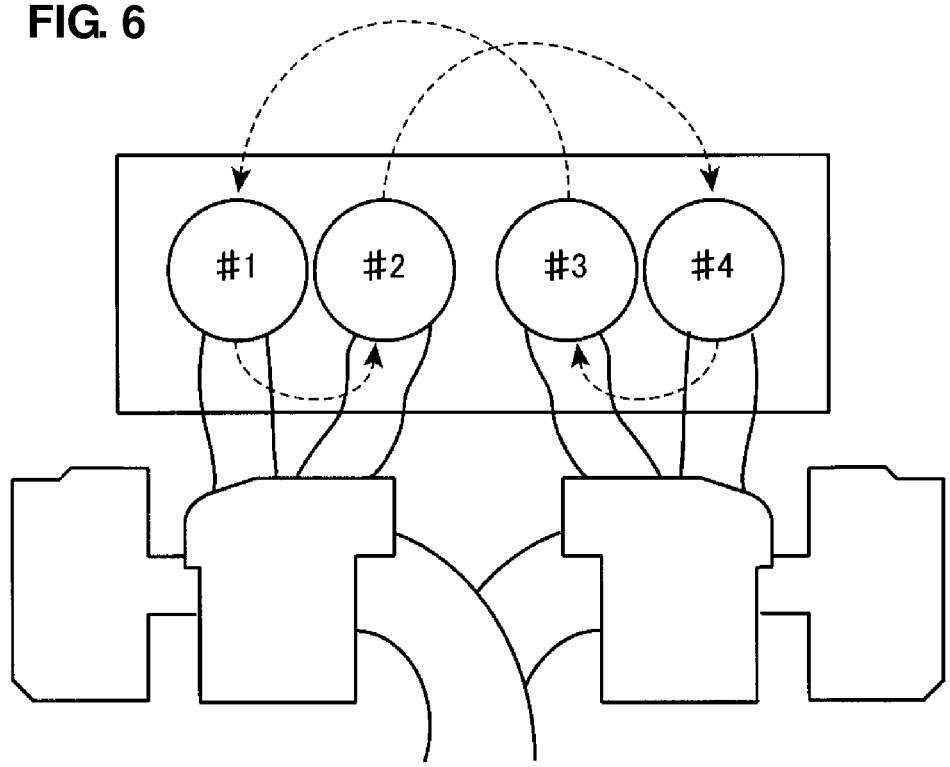
FIG. 6 is a diagram showing the order of another ignition timing of the inline four-cycle four-cylinder engine.

What is noticeable here is that four cylinders of the engine 1 are divided into two groups in such a manner that the cylinders C1, C4 which are positioned at end portions of the engine belong to different groups, and the cylinders C2, C3 which respectively have ignition timings adjacent to those of the cylinders C1, C4 belong to the respective groups of the cylinders C1, C4, and that two compact turbo chargers CH1, CH2 are provided for the above-described respective groups of cylinder. Herein, this four-cylinder engine 1 is an four-cycle engine, and the order of the ignition timing of this engine 1 is set to be #1, #3, #4, and #2 which is shown in FIG. 5, or #1, #2, #4, and #3 whish is shown in FIG. 6. That is, as described above, the cylinders C1, C4 positioned at the end portions of the engine 1 having the order of the ignition timing of #1, #2, #4, and #3 belong to the different groups, and the cylinder C2 and the cylinder C1, which have the adjacent ignition timings, belong to the same group, and the cylinder C3 and the cylinder C4, which have the adjacent ignition timings, belong to the other group.

The exhaust ports E11, E12, E21, E22 of the cylinders C1, C2 belonging to the same group are connected to a turbine T1 of the turbo chargers CH1 via cylinder pipes L1, L2. Meanwhile, the exhaust ports E41, E42, E31, E32 of the cylinders C4, C3 belonging to the same group are connected to another turbine T2 of the turbo chargers CH2 via cylinder pipes L4, L3. Intake air from intake passages LN1, LN2 is compressed by compressors CP1, CP2 which are driven by the above-described turbines T1, T2 respectively, and the compressed intake air is supplied to the respective cylinders C1, C2, C3, C4 through respective intake valves, not illustrated. Herein, intercoolers may be arranged between the compressors CP1, CP2 and the intake valves.

According to the above-described structure of the engine, the sufficient supercharging pressure can be provided by using the two compact turbo chargers CH1, CH2 to rotate the turbines efficiently in the low speed area of the engine 1 even in case the exhaust-gas temperature is relatively low due to the lean combustion. Further, since the cylinders C1, C2 and C3, C4 which have the adjacent ignition timings respectively are connected to the turbo chargers CH1 and CH2 respectively, the scavenging in the intake stroke of the cylinders C2, C3 having the early ignition timings can be promoted by the suction function of the exhaust stroke of the cylinders C1, C4 having the late ignition timings, and additional exhaust gas from the cylinders C1, C4 having the late ignition timings is supplied to the turbines T1, T2 when the turbines T1, T2 have been driven by the exhaust gas from the cylinders C2, C3 having the early ignition timings, so that the rotational speed of these turbines can be increased further.

While #1 and #3 or #4 and #2 have the adjacent ignition timings, respectively, in case of the order of the ignition timing of #1, #3, #4, and #2 or #1, #2, #4, and #3 in the above-described case of the inline four-cylinder engine, what is noticeable here is that a pair of #3 and #4 and another pair of #1 and #2, which have the adjacent ignition timings respectively, form the respective groups. Thereby, the two cylinders of #3, #4 or #1, #2 can be interconnected via the shortest path, respectively, so that the volumes of the cylinder pipes L3, L4 or L1, L2 connecting to the turbo charger CH1 or CH2 can be made properly small. Accordingly, the exhaust loss can be decreased and thereby the supercharging effect can be further improved.

Figure 7:
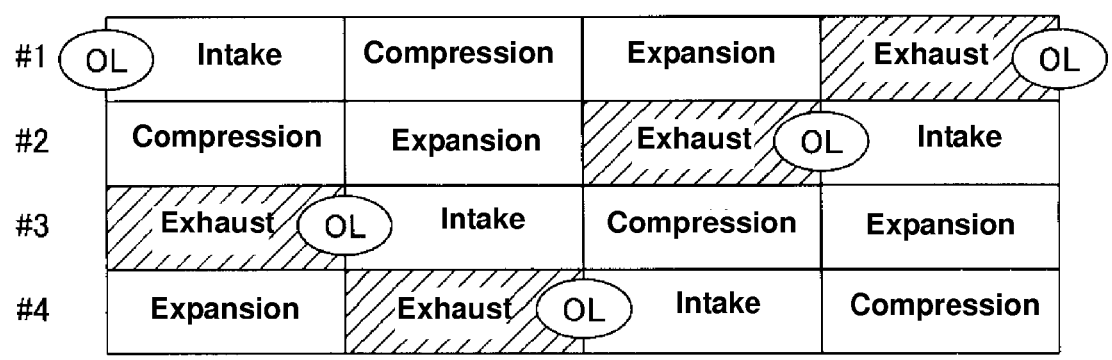
FIG. 7 is a chart explaining strokes of respective cylinders having the order of the ignition timing shown in FIG. 5.

The engine 1 has the valve overlap period during which the exhaust valve and the intake valve of each cylinder are both opened, and the strokes of the respective cylinders of the engine having the order of ignition timing of #1, #3, #4, and #2 are shown in FIG. 7. Herein, when the exhaust gas, especially the blow-down gas (the strong exhaust gas right after the opening of the exhaust valve) flows down in the independent cylinder pipes L1-L4, since these two pipes connect to each other respectively at the turbines T1 or T2 where the cylinder pipes L1, L2 or L3, L4 collect, the scavenging in the intake stroke of the cylinders C2, C3 having the early ignition timings, as described above, can be promoted by the suction function of the exhaust stroke of the cylinders C1, C4 having the late ignition timings. It may be preferable that, in order to enhance this effect, the valve overlap period of the intake valves and the intake valves of the cylinders C2, C3 having the early ignition timings overlap with the timing of the blow down of the cylinders C1, C4 having the late ignition timings (the timing right after the opening of the exhaust valve) so that the remaining gas in the intake stroke of the cylinders C2, C3 can be scavenged properly. Herein, it may be necessary that the exhaust passages of these cylinders C3, C4 or C2, C1 upstream of the collective portion (the turbine T1 or T2) are independent from each other. That is, the relationships of #1 (in the exhaust stroke) and #2 (in the intake stroke), #3 (in the exhaust stroke) and #1 (in the intake stroke), #4 (in the exhaust stroke) and #3 (in the intake stroke), and #2 (in the exhaust stroke) and #4 (in the intake stroke) can provide the above-described scavenging effect properly. In other wards, the independent arrangement of the exhaust passages of the cylinders having the adjacent ignition timing till the collective portion can provide the above-described effect properly.

Thus, according to the engine 1 of the present embodiment, the exhaust gas from the cylinders of #1, #2 and #3, #4 collect at the turbines T1, T2 and then flows to the turbo chargers CH1, CH2, respectively, so that the cylinders #4 (the exhaust stroke) and #3 (the intake stroke) and the cylinders #1 (the exhaust stroke) and #2 (the intake stroke) constitute the above-described relationships and thereby the scavenging can be further promoted.

Further, what is noticeable is that the two turbo chargers CH1, CH2 are arranged beside the cylinder head 2 in such a manner that their turbine shaft lines α1, α2 are positioned in line substantially in parallel to a straight line α0 of the cylinder line, and the turbines T1, T2 are positioned inward and close to the end cylinders C1, C4 and the compressors CP1, CP2 are positioned outward so as to be far away from each other. Thereby, exhaust passages E1, E2 from the turbines T1, T2 collect substantially at a central position between the two turbines T1, T2, and a single exhaust passage E0 downstream of the collective portion of the exhaust passages extends substantially perpendicularly to the above-described shaft a shaft direction of said turbine shaft lines α1, α2.

Herein, in general, in case the collective portion of the exhaust passages is located between the two turbo chargers CH1, CH2, there is a concern that a smooth flow of the exhaust gas may not be obtained if the collective portion is positioned closely to the turbo chargers. Further, in case the single exhaust passage E0 downstream of the collective portion is configured to curve with an angle of about 90 degrees from the collective portion, it may be necessary that the area of cross section of the exhaust passage is made large enough to ensure the sufficient amount of exhaust gas flowing down the exhaust passages in order to lighten the influence of a sharp curvature of the exhaust passages at the collective portion. Meanwhile, according to the above-described embodiment in which the turbines T1, T2 are positioned near the both end cylinders C1, C4, respectively, in such a manner that the front-side turbo charger CH1 is positioned at the front-side portion of the engine and the rear-side turbo charger CH2 is positioned at the rear-side portion of the engine, the distance between the two turbo chargers CH1, CH2 can be properly large. Thereby, the exhaust passages are connected to the turbo chargers CH1, CH2 with the properly small volume of the exhaust passages, so that the exhaust loss can be further decreased and the supercharging effect can be improved.

Figure 2:
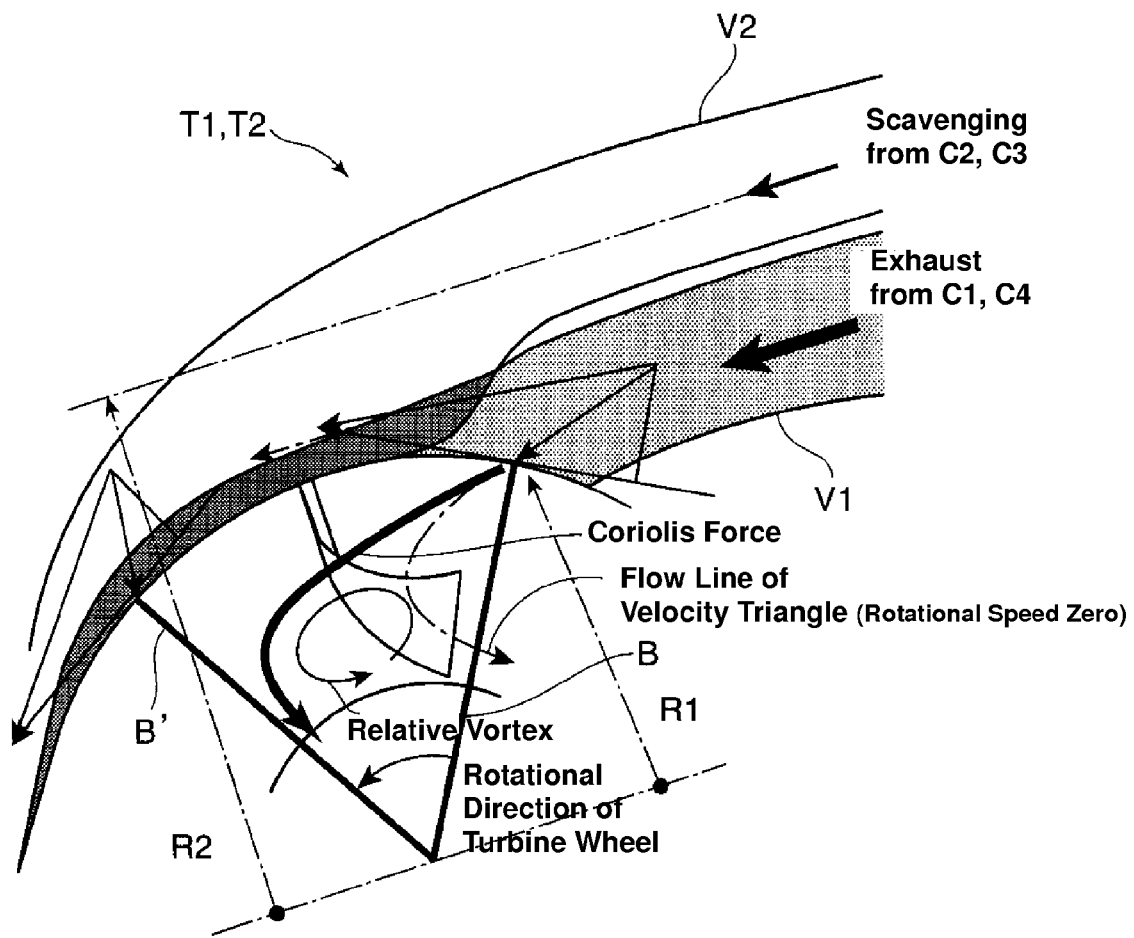
FIG. 2 is a schematic sectional view explaining a flow of exhaust gas in a turbine of a turbo charger.
Figure 3:
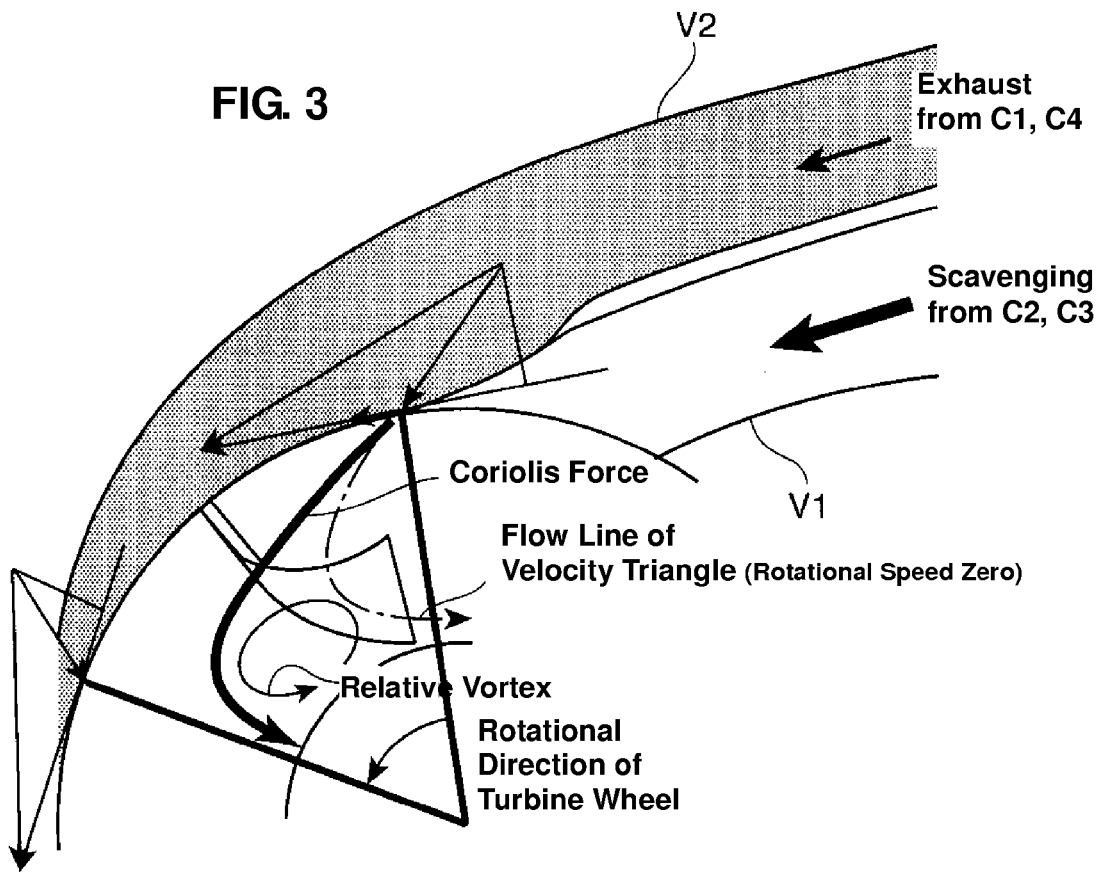
FIG. 3 is a schematic sectional view explaining another flow of exhaust gas in the turbine of the turbo charger.

FIGS. 2 and 3 are schematic sectional views explaining flows of exhaust gas in the turbines T1, T2 of the turbo chargers CH1, CH2. The turbines T1, T2 of the turbo chargers CH1, CH2 respectively comprise a turbine scroll which is comprised of turbine scrolls V1, V2, and respective turbine wheels, not illustrated, are stored in the turbine scroll comprised of the turbine scrolls V1, V2. Only blades B of the turbine wheels are illustrated in FIGS. 2 and 3. The turbine scroll V1 is formed at a relatively inside position of the turbine scroll so that the distance from the center of main flow of the exhaust gas to a rotational center of the turbine wheel is relatively short. Meanwhile, the turbine scroll V2 is formed at a relatively outside position of the turbine scroll so that the distance from the center of main flow of the exhaust gas to the rotational center of the turbine wheel is relatively long.

That is, in an example shown in FIG. 2, the cylinder pipes L1, L4 for the cylinders C1, C4 having the late ignition timings are connected to the inside-positioned turbine scroll V1, while the cylinder pipes L2, L3 for the cylinders C2, C3 having the early ignition timings are connected to the outside-positioned turbine scroll V2. Meanwhile, in another example shown in FIG. 3, the cylinder pipes L2, L3 for the cylinders C2, C3 having the early ignition timings are connected to the inside-positioned turbine scroll V1, while the cylinder pipes L1, L4 for the cylinders C1, C4 having the late ignition timings are connected to the outside-positioned turbine scroll V2.

Figure 4:
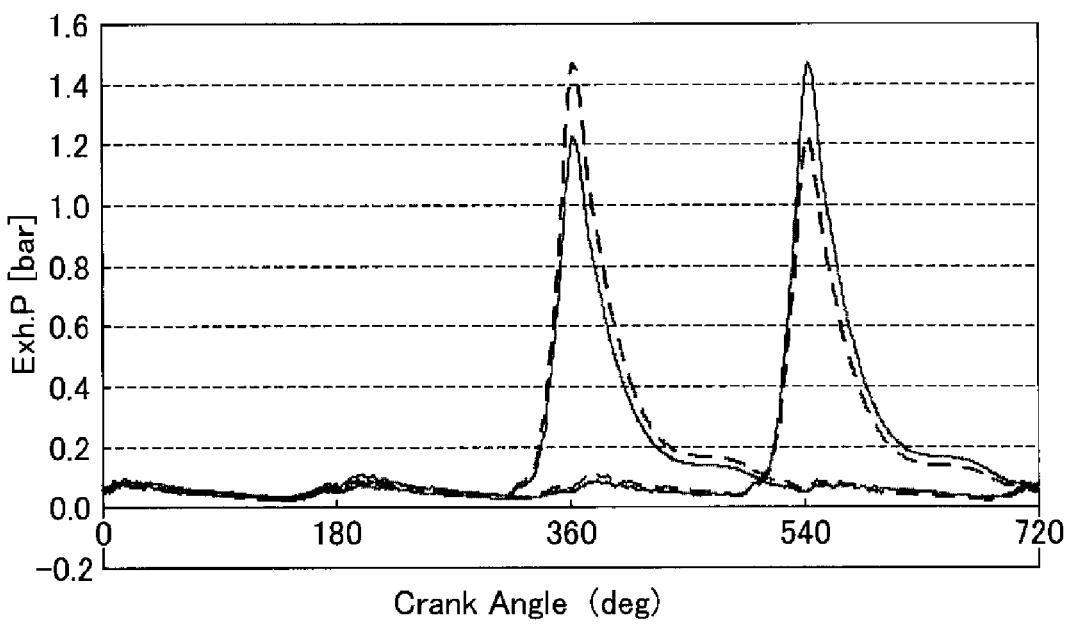
FIG. 4 is a graph explaining a difference in a pressure change at the turbine in a case in which a cylinder is connected to a turbine scroll as shown in FIG. 2 and in another case in which the cylinder is connected to the turbine scroll as shown in FIG. 3.

FIG. 4 is a graph which corresponds to FIGS. 2 and 3. The lateral axis of this graph denotes the timing (crank angle), and the vertical axis of this graph denotes the exhaust pressure. The graph of FIG. 4 shows the relationship between the cylinders C2, C1, that is, the pressure change at the turbo charger CH1. A solid line of this graph shows the pressure change in case the cylinder C1 is connected to the inside-positioned turbine scroll V1, and a broken line shows the pressure change in case the cylinder C2 is connected to the inside-positioned turbine scroll V1. Thus, despite the same diameter of the cylinder pipes (exhaust passages) L1-L4, the ratio of A/R of the cylinder pipe connected to the inside-positioned turbine scroll V1 which is close to the turbine wheel becomes great, and the volume of the turbine scroll V1 to the turbine inlet becomes small and the pipe-inside also becomes small. Thus, it can be understood that the dynamic pressure on the side of the inside-positioned turbine scroll V1 becomes greater than that on the side of the outside-positioned turbine scroll V2 located at the outside position.

Thus, by setting the cylinders C1, C4 having the great dynamic pressure as the one having the relatively late ignition timing as shown in FIG. 2, the composite dynamic pressure at the turbines T1, T2 can be increased, that is, the rotational speed of the turbines can be further increased by the additional exhaust gas from the cylinders C1, C4 having the late ignition timings after the turbines have been driven by the exhaust from the cylinders C2, C3 having the early ignition timings. Thereby, the turbine drive force can be properly enhanced. Further, since the ratio of A/R of the cylinder pipes L1, L4 from the cylinders C1, C4 having the late ignition timings is relatively great, the energy which is large enough to overcome the pressure pulsation of the exhaust gas from the cylinders C2, C3 having the early ignition timing can be obtained, thereby stabilizing the turbine drive force.

Meanwhile, the turbine scrolls V1, V2 are configured such that their inside portions are respectively separated from each other until positions right before their turbine wheels so as not to mix the exhaust gas between them, so that the exhaust interference is relatively small. Herein, by connecting the cylinder pipes L2, L3 for the cylinders C2, C3 having the early ignition timings to the inside-positioned turbine scroll V1 and also by connecting the cylinder pipes L1, L4 for the cylinders C1, C4 having the late ignition timings to the outside turbine scroll V2 as shown in FIG. 3, the exhaust gas from the cylinders C1, C4 having the late ignition timings acts at a forward position in the rotational direction of the turbine. Accordingly, the Coriolis force is produced, so that the suction force can be made act on the cylinder pipes L2, L3 for the cylinders C2, C3 having the early ignition timings. Thereby, the scavenging is further promoted, and thereby the thermal efficiency of the engine improved. Consequently, the efficiency of the turbines T1, T2 and the compressors CP1, CP2 improve, so that the engine torque can be improved.

The present invention should not be limited to the above-descried embodiment, and any other modifications and improvements may be applied within the scope of a sprit of the present invention.

What is claimed is:

1. An inline four-cylinder engine with two turbo chargers, in which four cylinders and exhaust ports of the four cylinders are arranged in line at a single cylinder head, exhaust gas from the exhaust ports is introduced to the two turbo chargers, and an exhaust valve and an intake valve of each cylinder have a valve overlap period during which the exhaust valve and the intake valve are both opened,
wherein exhaust passages of the engine which connect to the exhaust ports of the four cylinders are divided into two groups, each group being provided for two cylinders which comprise an end-portion cylinder positioned at an end portion, in a line direction, of the engine and a central-portion cylinder positioned beside said end-portion cylinder and having an ignition timing which is adjacent to an ignition timing of said end-portion cylinder such that said ignition timing of said central-portion cylinder and said ignition timing of end-portion cylinder are one of a relatively-early ignition timing and a relatively-late ignition timing respectively, said two turbo chargers are arranged for said two groups of exhaust passages one each,
each of said two groups of exhaust passages is comprised of two independent cylinder pipes which independently connect to the exhaust ports of the two cylinders,
each of said turbines of said two turbo chargers comprises a pair of turbine scrolls which are independently connected to said two cylinder pipes and a turbine wheel which is driven by the exhaust gas flowing down through said two cylinder pipes, the pair of turbine scrolls comprising an outside-positioned turbine scroll which is arranged at a relatively-outside position in the turbine so as to have a relatively-long distance from a rotational center of the turbine wheel and an inside-positioned turbine scroll which is arranged at a relatively-inside position in the turbine so as to have a relatively-short distance from the rotational center of the turbine wheel, and
one of said two independent cylinder pipes for the cylinders having a relatively-early ignition timing is connected to said outside-positioned turbine scroll, and the other of said two cylinder pipes for the cylinders having a relatively-late ignition timing is connected to said inside-positioned turbine scroll.

2. The inline four-cylinder engine with two turbo chargers of claim 1, wherein said two turbo chargers are arranged beside said cylinder head such that each turbine and compressor thereof are arranged substantially in parallel to an arrangement direction of the four cylinders, both of the turbines are located between both of the compressors in the arrangement direction of the cylinders, and respective turbine shafts of the two turbo chargers are positioned on a specified common line which is arranged substantially in parallel to the arrangement direction of the cylinders,
each of the turbines of the two turbo chargers is arranged at a position which is located beside the two cylinders connected thereto and closer to said end-portion cylinder than said central-portion cylinder in the arrangement direction of the cylinders, and
two exhaust passages downstream of the turbines of the two chargers collect substantially at a central position between the two turbines, and a single exhaust passage downstream of a collective portion of the exhaust passages extends substantially perpendicularly to said specified common line.

* * * * *